United States Patent [19]

Short et al.

[11] Patent Number: 4,989,548
[45] Date of Patent: Feb. 5, 1991

[54] INSTANT/DISPOSABLE WILD BIRD FEEDER

[76] Inventors: Leonard V. Short, 31 Crestview Dr., Jaffrey, N.H. 03452; Raymond Friedman, 5944 St. Agnes Dr., Plano, Tex. 75093

[21] Appl. No.: 484,217
[22] Filed: Feb. 12, 1990
[51] Int. Cl.⁵ .............................................. A01K 5/00
[52] U.S. Cl. .................................. 119/52.2; 119/52.1
[58] Field of Search ................... 119/52.2, 52.1, 51.01, 119/57.8, 57.4

[56] References Cited
U.S. PATENT DOCUMENTS

| | | | |
|---|---|---|---|
| 1,916,230 | 7/1933 | Murray | 119/52.2 |
| 2,746,665 | 5/1956 | Wiggins | 119/52.1 X |
| 2,775,226 | 12/1956 | Early | 119/52.2 |
| 2,891,711 | 6/1959 | Early | 119/52.2 X |
| 4,706,851 | 11/1987 | Hegedus et al. | 119/57.8 |

Primary Examiner—Gene Mancene
Assistant Examiner—R. Thomas Price
Attorney, Agent, or Firm—Allegretti & Witcoff, Ltd.

[57] ABSTRACT

A vacuum-formed instant/disposable bird feeder for dispensing seeds into both sides of the feeder tray using a diverter projecting into the seed reservoir as shown in particular in FIG. 4 is disclosed. A controlled flow of the seed is achieved by the diverter and by adjusting the distance between the bottom of the filling spout and the feeder tray.

3 Claims, 3 Drawing Sheets

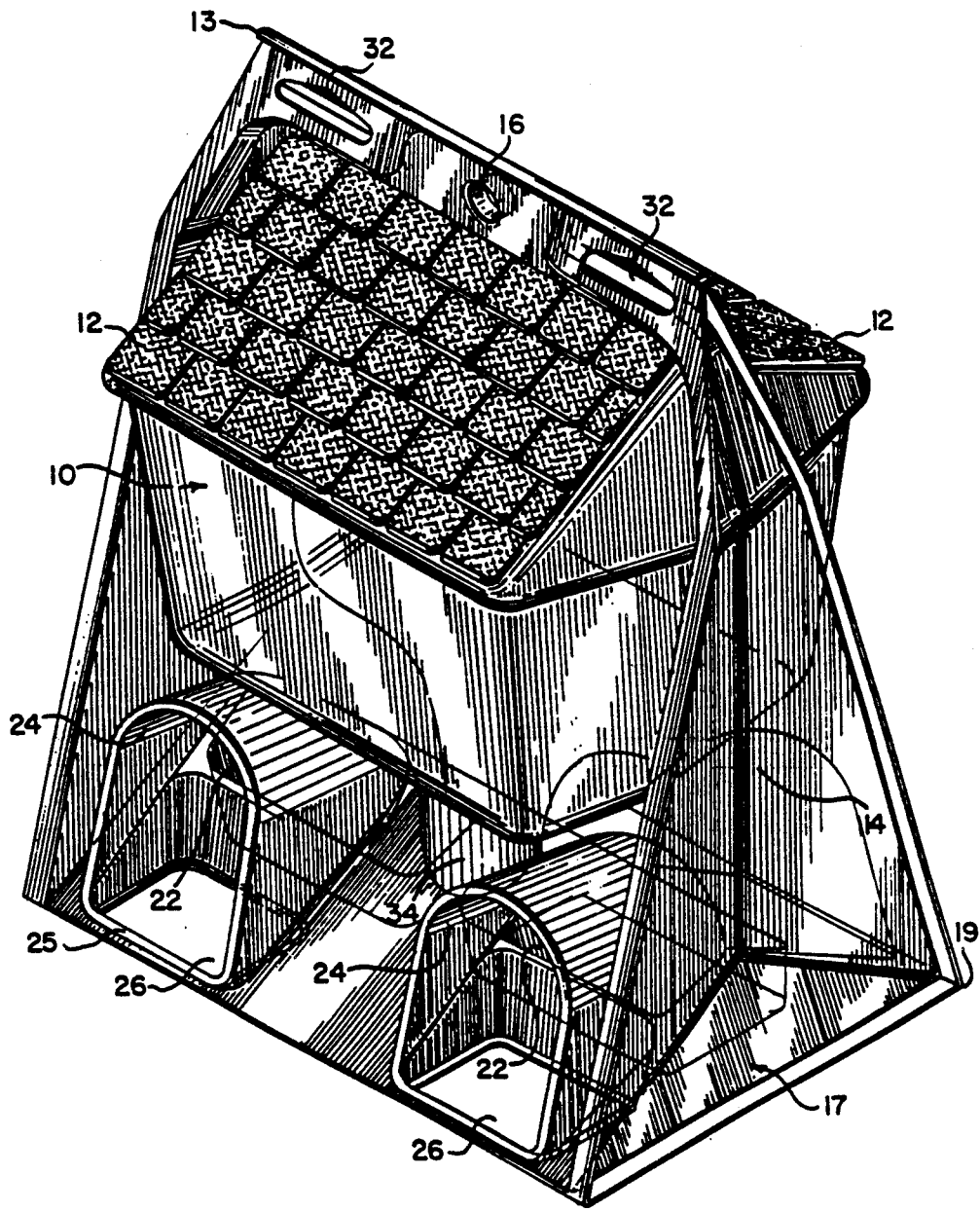

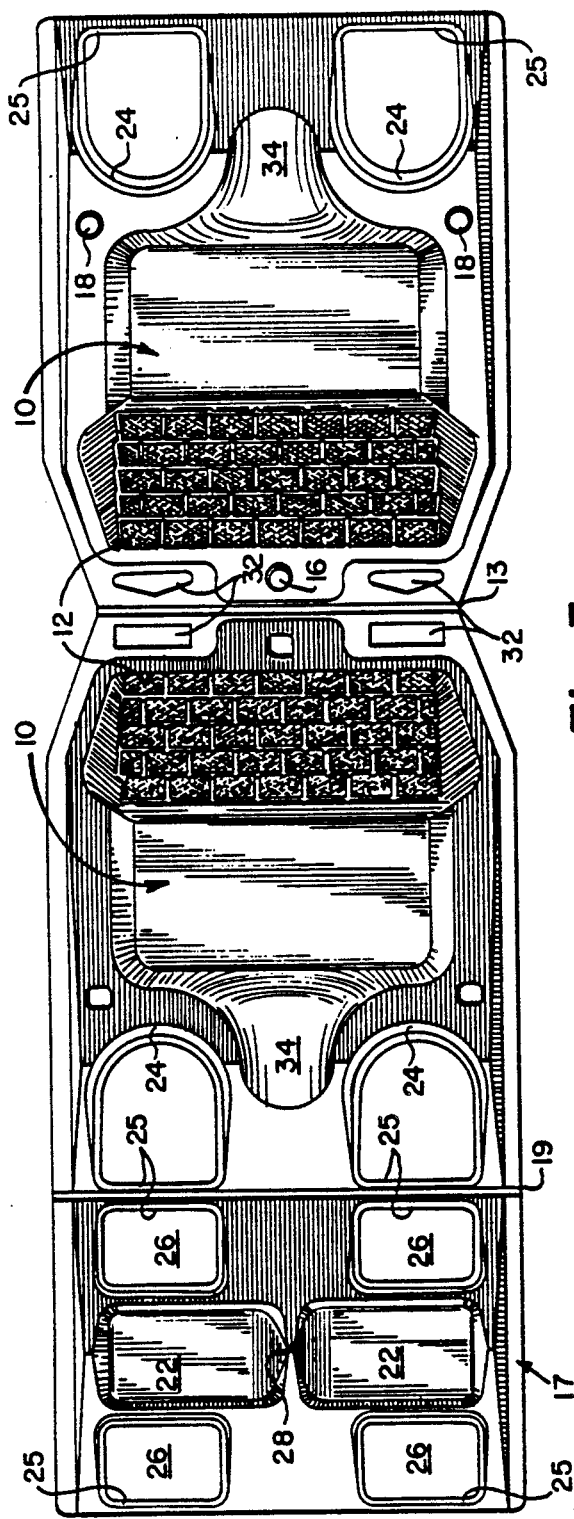
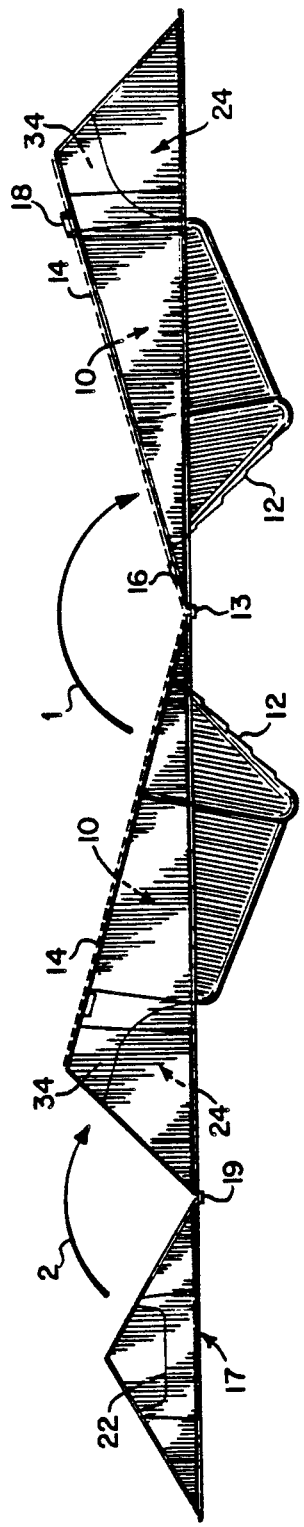

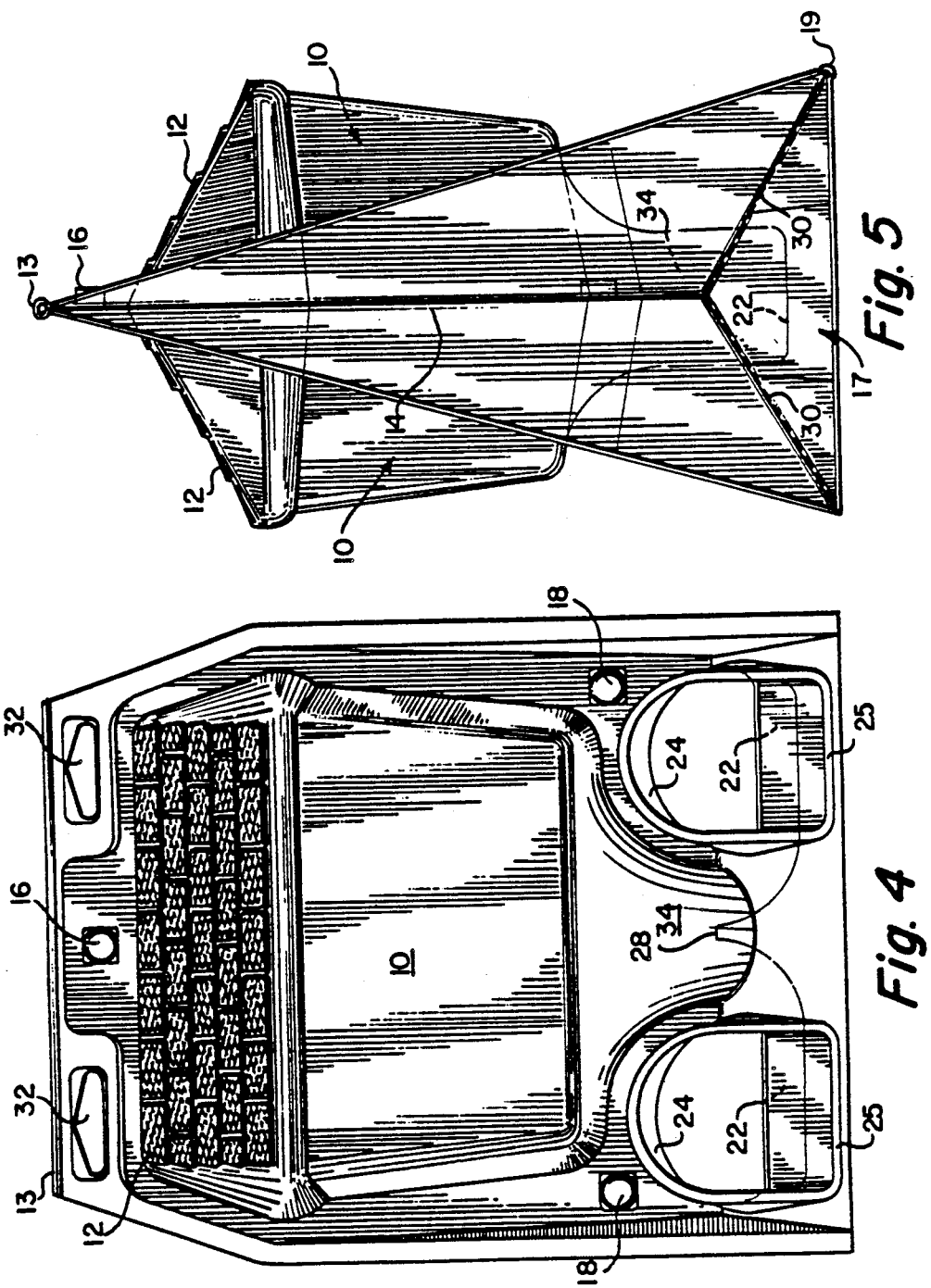

INSTANT/DISPOSABLE WILD BIRD FEEDER

FIELD OF THE INVENTION

This invention relates to instant/disposable bird feeders, and more specifically, to vacuum-formed, readily instant/disposable bird feeders whose seed flow from the reservoir to the feeding ports is metered and controlled through a diverter. The object of this invention is to provide a low-cost, ready to use, limited or one-time use bird feeder to be used as a device for alluring and feeding small, wild birds while controlling the flow of seed to reduce waste and yet assure a constant, even flow of seed to the feeding ports. This feeder is of a unique one piece construction that permits manufacturing cost efficiencies.

BACKGROUND OF THE INVENTION

This invention pertains to bird seed feeders of the limited time use or disposable type which comprises a container for the bird seed, a feeding port, and a perch for the bird. In general, see for example, U.S. Pat. Nos. 4,570,575, 4,649,865, 4,690,101 4,607,597, 4,637,344 which relate to this type of bird feeder. One such bird feeder is disclosed in U.S Pat. No. 4,606,298. In this patent, a single plastic sheet commonly known as a "blister pack" is vacuum-formed producing a bird feeder containing a seed reservoir and the feeding port and the perch. In such a bird feeder, because of the plastic, static, electriciy and the inherent chaff in the bird food, it is difficult to find a clean surface to seal the back to the container. Accordingly, in the '298 patent it teaches the use of a chipboard or cardboard as a backing. In contrast, and to solve the sealing problem, the bird feeder according to the present invention contains no backing.

In use, the consumer must cut a feeding port in the bird feeder described in the '298 patent to allow the bird seed to cascade to the bottom of the feeding area and the perch is formed by folding the flat position to 90 degrees. By contrast, as will become more apparent from the following description, the instant/disposable bird feeder requires only that the user hang and remove the chipboard or cardboard restraint to begin the seed flow and put the bird feeder into use.

SUMMARY OF THE INVENTION

Briefly stated, the present invention discloses an instant/disposable bird feeder intended to have a limited time use as an economical way for the consumer to feed and observe wild birds. Amoung the unique features displayed in the present invention is a diverter, which functions to control seed flow from the reservoir by diverting the seed from the reservoir into the two feeding trays at a metered and consistent flow rate. To further prevent waste and spillage, there are raised edges along the outside edges of the feeding trays. The flow rate and tray edges are designed to keep a constant supply of seed at the four feeding ports.

Additionally, each feeding port has a built-in shroud which prevents the seed from becoming exposed to the weather or from being blown out of the feeder because of wind. Furthermore, the height and width of the shroud control the size of the bird or species of bird that can conveniently feed from the feeder.

According to this invention, the bird feeder is manufactured through a vacuum form molding process from a single sheet of plastic. It is subsequently filled with bird seed and sealed. The seed is restrained and held in place for transport and storage with a piece of chipboard or cardboard. When the consumer is ready to position the bird feeder into place, s/he simply removes the chipboard and the seed begins to flow from the reservoir to the feeding trays. Because this bird feeder is equipped with a diverter, the seed flow is uniform and does not overflow the feeding area. The level of the bird food in the reservoir can be conveniently monitored by the consumer since the bird feeder is molded from a transparent plastic sheet, known as a "blister pack". Once the feeder is exhausted of all the bird seed, the consumer disposes of the pack.

DETAILED DESCRIPTION OF THE INVENTION

Various details of this invention will now be examined more closly with reference to the accompanying drawings.

FIG. 2 is a flat side view of the invention;

FIG. 3 is a flat front top view of the invention;

FIG. 4 is a folded front view of the invention; and

FIG. 5 is a folded side view.

Figure 1:
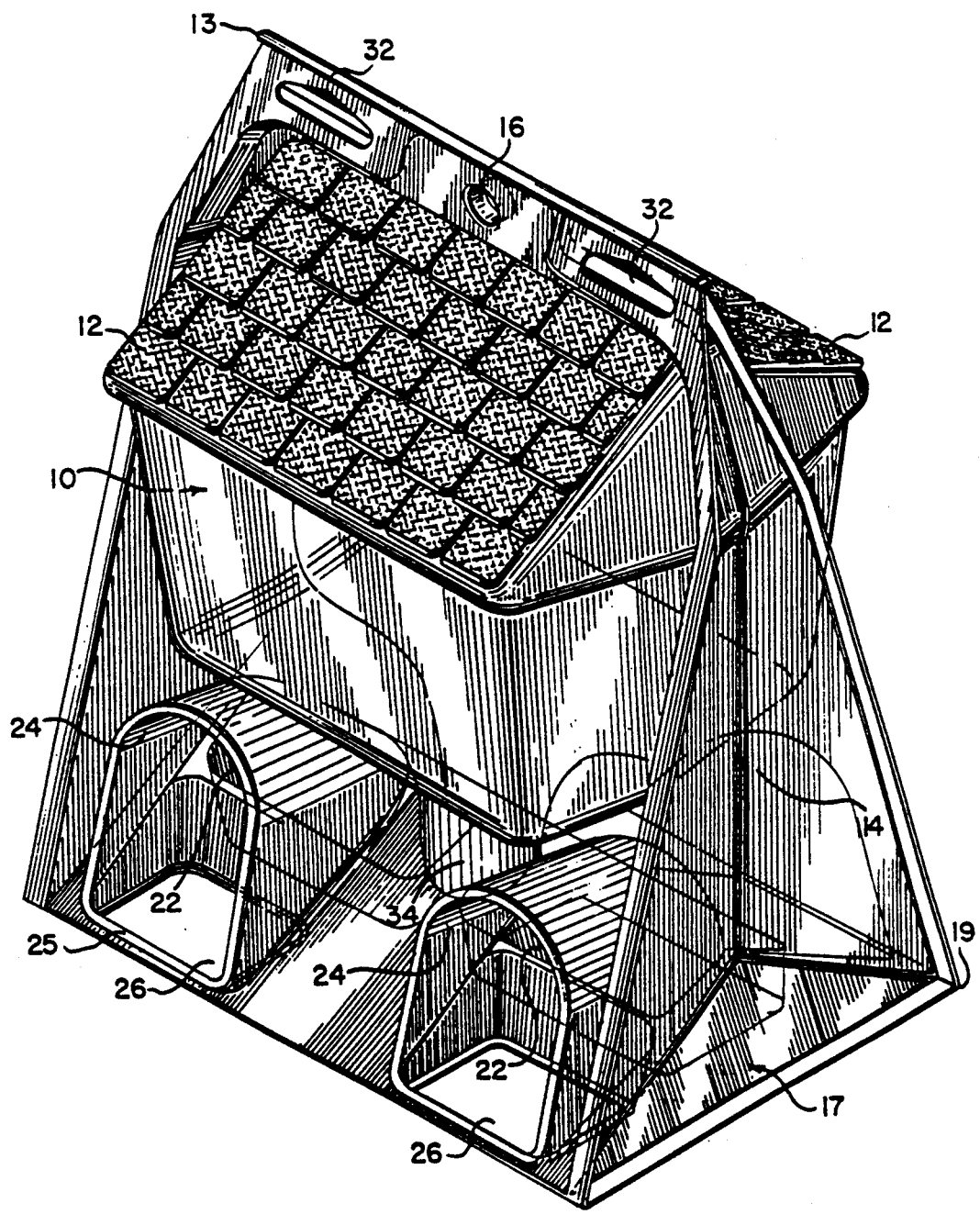
FIG. 1 is a perspective view of the entire embodiment.

Referring first to FIG. 2, the blister pack comprises two identical sections to be used as the top and side walls of the embodiment and the embodiment and a third section to be used as the bottom tray of the feeder. Fold 1 is made on the upper hinge 13 and the two identical halves come together to form the roof 12, reservoir 10, and feeding ports or arches 24 of the bird feeder. The bottom tray, or feeding area, is represented by 17 in FIG. 2. When Fold 1 is accomplished, the joints along the sides of 14, represented by dotted line in FIG.2, are then sonically sealed. A small button 16 located at the top of the feeder above the reservoir, and two small buttons 18, located on either side of the reservoir, also aid in sealing the two halves together.

When the sealing of the two halves is complete, the bird feeder is inverted and the reservoir 10 is filled with bird seed through the still open bottom tray 17 and the fill hole 34, typically about 1.5", as illustrated in FIG. 3. Fold 2, as shown in FIG. 2, is then made on the lower hinge 19 and the joints forming a triangular shape, represented by a dotted line 30 in FIG. 5, are then sonically sealed along both side of the feeder. In order to completely restrain the seed in the reservoir, a piece of chipboard or cardstock (not shown) is inserted through the triangular section 30 FIG. 5. This prevents seed flow during shipment and storage.

The blister pack includes two feeding trays 22 separated by a diverter 28 and four feeding ports 24 as best shown in FIG. 3. Also visible are the four perches 25 integral with trays 22 on which the birds will sit while feeding from the four arches or feeding ports 24. With Fold 2 completed, the feeding trays are positioned such that small birds who are sitting on the perches will be able to access seed in the feeding ports 24 and feed from the trays 22. When the feeder is hung in an upright position, bird seed flows through projection 34 into the feeding area. The diverter 28, situated between the two feeding ports 24 and extending upward from the bottom section of the embodiment, is used to prevent the overflowing of seeds from the reservoir 10 into the feeding trays 22. By adjusting the slope of and/or height of the diverter 28, the cascading of the seed is readily controlled. Thus, for example, the steeper the slope, the slower the flow rate of the seed and vice versa. The diverter therefore functions as a control for the flow rate of the seed.

The distance between the bottom of the filling spout 34 and the bottom of the feeding tray 22 together with the diverter 28 is also used to control the feed rate. Thus, the relationship between the diameter of the reservoir exit aperture 34 and the diameter and height of the diverter 28, FIG. 3 allows for precise control of the flow rate of the seed to the feeding trays. This relationship can be adjusted depending upon the type and size of the seed used in the feeder. The diameter of the aperture 34 is dependent upon the device used to fill the empty feeder reservoir. This could range in size from approximately 1" to more than 2". To a large extent, the size of the aperture is dependent on the filling machine's flow rate.

Located at the top of the feeder along the peripheral flat surface are two apertures 32 as seen in FIG. 4, for hanging the bird feeder. The openings allow the feeder to be hung from a tree branch or other appropriate suspending surface so that the feeder is self-adjusting for balance.

We claim:

1. An instant/disposable bird feeder comprising a blister pack formed from a single piece of material, said blister pack including an upper main portion having two substantially vertical outward walls being formed by folding two identical halves together and two substantially horizonal bottom walls containing bird food, and a recessed lower portion into which bird food is free to flow by gravity from the upper main portion through a narrowed reservoir exit aperture into two distinct feeding trays, said flow being regulated by a diverter means to ensure even distribution of the seed, and four perches, integral with the lower portion, said lower portion begin in the form of a recess containing four ports which provide access for a bird to bird food.

2. A bird feeder according to claim 1 wherein said diverter means is a projection situated between two feeding ports and extending upward from said lower portion.

3. A bird feeder according to claim 1 having a removable flow preventer inserted between said exit aperture and said diverter means to prevent flow during shipping and storage.

* * * * *